United States Patent [19]

Currie et al.

[11] Patent Number: 5,429,854

[45] Date of Patent: Jul. 4, 1995

[54] APERTURED ABRASIVE ABSORBENT COMPOSITE NONWOVEN WEB

[75] Inventors: Kenneth J. G. Currie, Holywell; Philip J. Mogel, Caerswys, both of Great Britain

[73] Assignee: Kimberly-Clark Corporation, Neenah, Wis.

[21] Appl. No.: 71,167

[22] Filed: Jun. 2, 1993

[30] Foreign Application Priority Data

Jun. 2, 1992 [GB] United Kingdom ............... 9211672

[51] Int. Cl.⁶ .......................... B32B 3/10; B32B 5/06; A47K 7/02
[52] U.S. Cl. .................... 428/138; 428/137; 428/286; 428/287; 428/296; 428/302; 428/903; 15/209.1; 15/215
[58] Field of Search ............ 428/131, 132, 138, 137, 428/286, 287, 296, 298, 903, 302; 15/209.1, 215

[56] References Cited

U.S. PATENT DOCUMENTS

| | | | |
|---|---|---|---|
| 3,175,331 | 3/1965 | Klein | 51/400 |
| 3,234,577 | 2/1966 | Mann, Jr. | 15/217 |
| 3,408,776 | 11/1968 | Kalwaites | 51/324 |
| 4,029,834 | 6/1977 | Bartlett | 428/62 |
| 4,143,194 | 3/1979 | Wihksne | 428/81 |
| 4,328,275 | 5/1982 | Vargo | 428/156 |
| 4,355,066 | 10/1982 | Newman . | |
| 4,421,809 | 12/1983 | Bish et al. | 428/90 |
| 4,439,474 | 3/1984 | Sagel | 428/90 |
| 4,469,734 | 9/1984 | Minto et al. | 428/134 |
| 4,482,593 | 11/1984 | Sagel et al. | 428/90 |
| 4,564,546 | 1/1986 | Jones | 428/81 |
| 4,587,148 | 5/1986 | Campbell et al. | 428/88 |
| 4,588,630 | 5/1986 | Shimalla | 428/131 |
| 4,605,454 | 8/1986 | Sayovitz et al. | 428/286 |
| 4,609,580 | 9/1986 | Rockett et al. | 428/198 |
| 4,614,679 | 9/1986 | Farrington et al. | 428/138 |
| 4,659,609 | 4/1987 | Lamers et al. | 428/194 |
| 4,715,150 | 12/1987 | Takeuchi et al. | 51/395 |
| 4,724,114 | 2/1988 | McFarland et al. | 264/510 |
| 4,741,941 | 5/1988 | Englebert et al. | 428/71 |
| 4,780,352 | 10/1988 | Palumbo | 428/138 |
| 4,820,577 | 4/1989 | Morman et al. | 428/297 |
| 4,822,669 | 4/1989 | Roga | 428/287 |
| 4,849,271 | 7/1989 | Weihrauch | 428/88 |
| 4,885,659 | 12/1989 | Nowell et al. | 361/212 |
| 4,886,632 | 12/1989 | Van Iten et al. | 264/156 |
| 4,886,697 | 12/1989 | Perdelwitz et al. | 428/192 |
| 4,893,439 | 1/1990 | McAvoy et al. | 51/400 |
| 4,900,377 | 2/1990 | Redford et al. | 156/62.2 |
| 4,950,526 | 8/1990 | Singleton | 428/166 |
| 5,024,868 | 6/1991 | Petersen | 428/88 |
| 5,180,620 | 1/1993 | Mende | 428/138 |
| 5,213,588 | 5/1993 | Wong et al. | . |

FOREIGN PATENT DOCUMENTS

| | | | |
|---|---|---|---|
| 1014191 | 7/1977 | Canada | 296/80 |
| 1256752 | 7/1989 | Canada | 117/59 |
| 262817A | 4/1988 | European Pat. Off. . | |
| 2017485 | 10/1979 | United Kingdom . | |
| 9004060 | 4/1990 | WIPO . | |

*Primary Examiner*—James D. Withers
*Attorney, Agent, or Firm*—Karl V. Sidor

[57] ABSTRACT

An absorbent, abrasive composite nonwoven web (42) may include at least four layers with two of the layers being formed by meltblowing (10, 54) and two of the layers being supporting carrier layers (14, 58). One of the meltblown layers is an abrasive surface layer (10) formed from a coarse, shot-laden meltblown layer (10) while another meltblown layer is disposed in the interior of the composite web (42) and is adapted to provide absorbency characteristics to composite. The carrier layers (14,58) may be formed from spunbonded webs. The abrasive surface layer (10) and its supporting carrier layer (14) are joined together by hot pin aperturing.

27 Claims, 3 Drawing Sheets

APERTURED ABRASIVE ABSORBENT COMPOSITE NONWOVEN WEB

The present invention relates to abrasive and absorbent composite nonwoven webs.

Nonwoven thermoplastic webs are well known for a wide variety of end-uses, such as for wipes, hand towels, surgical gowns, dressings and the like. These products are generally made by either meltblowing or spunbonding or a combination of meltblown and spunbonded layers. The processes of both spunbonding and meltblowing are well known in the art. See, for example, U.S. Pat. No. 3,978,185 to Bunting et al. which issued on 31 Aug. 1976, which describes meltblowing and is herein incorporated by reference. Those in the art are also directed to U.S. Pat. No. 3,692,618 to Dorschner et al. which issued on 19 Sep. 1972, which describes spunbonding and is herein incorporated by reference.

Spunbonding generally entails extruding a multiplicity of continuous thermoplastic polymer strands through a multiplicity of die orifices in a downward direction onto a moving surface where the extruded strands are collected in randomly distributed fashion. The randomly deposited strands are then bonded together in a heated nip to provide sufficient integrity to the resulting nonwoven web of generally continuous fibers. Spunbonded webs are generally characterized by a high strength/weight ratio, isotropic strength, high porosity, and good abrasion resistance and are useful for a wide variety of product applications ranging from diaper liners to street repair fabrics.

Meltblowing differs from spunbonding in that the extruded polymer strands may be, depending upon the processing conditions and the material which is being meltblown, broken up and dispersed as individual fibers by a forced air stream before being deposited onto the collecting surface. In addition, the fibers, depending upon the forming distance, may be substantially cooled by the air so that they do not significantly bond together. In this situation bonding of the web to retain integrity and strength occurs as a separate downstream operation. Alternatively, generally speaking, with shorter forming distance, the meltblown fibers can be deposited in a tacky state so that in-situ autogenous bonding occurs without further bonding steps. Meltblown webs are typically characterized by their softness, bulk, absorbency, low porosity and poor abrasion resistance and are useful for a variety of product applications including, for example, surgical drapes and wipes.

Notwithstanding the fact that much nonwoven product development is directed toward products which provide enhanced softness and greater flexibility, those in the art have also developed an inexpensive nonwoven product which is sufficiently abrasive to serve as a cleaning wipe without using added abrasive materials. This wipe is also soft enough to reduce or substantially eliminate scratching the surface being cleaned. This material is disclosed in U.S. Pat. No. 4,659,609 to Lammers et al. which discloses a layered abrasive web including a supporting layer and a meltblown abrasive layer intimately thermally bonded together. The meltblown abrasive layer generally has a basis weight of from about 5 to about 25 grams per square meter (gsm) and is formed from fibers having an average fiber diameter of at least about 40 micrometers, for example, from about 40 to about 85 micrometers. More particularly, the meltblown abrasive layer is formed from fibers having an average fiber diameter of about 50 micrometers. Such a web provides an abrasive wipe at very low materials costs. It is stated that the meltblown layer is very thin, having a basis weight substantially lower than that of typical meltblown webs. It is also stated that the supporting layer, which is preferably a spunbonded web because of its high strength-to-weight ratio, provides necessary product strength and integrity and, in some instances, absorbency. Another example of a product form of this invention is stated to be a single-ply three-layered abrasive wipe (meltblown/spun-bonded/meltblown) in which both outer surfaces are abrasive meltblown layers. A further example is stated to be a three-ply wiping product wherein a first outer ply includes (1) an abrasive meltblown/spunbonded layered web having the abrasive meltblown layer facing outwardly, (2) an inner ply of a water-permeable nonwoven thermoplastic web, and (3) a second outer ply of a water-permeable meltblown thermoplastic web. It is stated that each of these plies is bonded together along the periphery of the wipe and a detergent is contained between the inner ply and the second outer ply. A still further example of a product form of this invention is a shower cloth comprising a two-layered meltblown/spunbonded web, constructed of two separate plies or one ply folded over on itself, such that the abrasive meltblown layer is the exposed layer on both outer surfaces.

In spite of the availability of these various products, those of skill in the art continue to search for improvements to such products and a need still exists for such improvements for, in some instances, the absorbency of the materials is inadequate or the interlayer cohesion of the material is inadequate. In such circumstances the layers may well delaminate when the material is subjected to the severe shearing forces encountered by a wipe during the wiping operation. In other instances, the abrasiveness of the material may well be unsatisfactory.

SUMMARY OF THE INVENTION

In response to the problems, discussed above, which have been encountered by those of skill in the art, a material which may be used as either a wipe, a floor mat or otherwise has been discovered. The material, which has satisfactory abrasive and absorbency characteristics is provided by a composite nonwoven web which includes (1) a first surface layer including a coarse, shot-laden meltblown layer formed from a thermoplastic material, (2) a first interior layer immediately adjacent the first surface layer, the first interior layer including a supporting carrier layer formed from a thermoplastic material, (3) a second surface layer including a supporting carrier layer formed from a thermoplastic material, and (4) a second interior layer immediately adjacent the second surface layer, the second interior layer including a fine, absorbent meltblown layer formed from a thermoplastic material.

Importantly, the coarse, shot-laden layer and the adjacent supporting carrier layer are hot pin apertured prior to their being joined to the absorbent layer and its supporting carrier layer. The hot pin aperturing of these two layers provides a three-dimensional effect which improves the abrasiveness of the coarse, shot-laden meltblown layer.

Desirably, the hot pin aperturing is carried out at an elevated temperature of from about 100 degrees F. (38 degrees Centigrade) to about 150 degrees F. (66 degrees Centigrade). For example, the hot pin aperturing may be carried out at an elevated temperature of from about 115 degrees F. (46 degrees Centigrade) to about 125 degrees F. (52 degrees Centigrade).

Typically, the coarse, shot-laden meltblown layer and its supporting carrier layer are passed between the nip formed by a pin roller and an a apertured roller where the apertures of the apertured roller correspond to the pins of the pin roller. The coarse, shot-laden meltblown layer is typically oriented to be adjacent the apertured roller. Generally speaking, the temperatures of the pin roller and the apertured roller should be approximately the same because of the effects of thermal expansion on the pins and apertures.

Typically, the depth of penetration of the pins of the pin roller should be at least about 0.061 inches (0.155 centimeters). For example, the depth of penetration of the pins of the pin roller may range from about 0.061 inches (0.155 centimeters) to about 0.100 inches (0.254 centimeters) More particularly, the depth of penetration of the pins of the pin roller may range from about 0.071 inches (0.180 centimeters) to about 0.095 inches (0.241 centimeters). Even more particularly, the depth of penetration of the pins of the pin roller may range from about 0.081 inches (0.206 centimeters) to about 0.091 inches (231 centimeters).

The pressure in the nip created by the pin roller and the apertured roller may vary from about 60 to about 110 pounds per square inch, gauge (psig). For example, the pressure in the nip created by the pin roller and the apertured roller may vary from about 70 to about 110 pounds per square inch, gauge (psig). More particularly, the pressure in the nip created by the pin roller and the apertured roller may vary from about 90 pounds per square inch, gauge (psig) to about 110 pounds per square inch, gauge (psig). For example, the pressure in the nip created by the pin roller and the apertured roller may be about 100 pounds per square inch, gauge (psig).

The pin and apertured rollers serve to mold the fibers of the coarse, shot-laden meltblown layer and the fibers of the supporting carrier layer into a three-dimensional generally conical shape. Elevation of the temperature of the pin aperturing apparatus serves to lock the apertured surface into the three-dimensional shape formed when the heated pins penetrate through both the coarse, shot-laden layer and its supporting carrier layer into the apertured roller. Accordingly, the surface area of the apertured layers is increased. Additionally, the three-dimensional stabilized structure presents a much more aggressive abrasive medium for the removal of coarse dry dirt when the material is utilized as part of a wiper. Moreover, the three dimensional structure provides macro-pits and macro-troughs which act to entrap dirt in addition to the dirt trapping ability of the voids of the coarse, shot-laden meltblown layer. Lastly, it can also be stated that the apertures facilitate the transfer of liquid through the composite web when it is being utilized to wipe up liquids.

The running speed of the coarse, shot-laden meltblown layer and its supporting carrier layer while hot pin aperturing is taking place should be limited to no more than about 50 feet per minute (15.2 meters per minute). At greater speeds detachment of the two layers occurs suggesting that the pins are having a "plucking" effect upon the composite. In particular, the running speed of the layers during hot pin aperturing may range from about 10 to about 50 feet per minute (3 to about 15 meters per minute). More particularly, the running speed of the layers during hot pin aperturing may range from about 15 to about 30 feet per minute (4.5 to about 9 meters per minute). Even more particularly, the running speed of the layers during hot pin aperturing may range from about 15 to about 20 feet per minute (4.5 to about 6 meters per minute).

The carrier layers on the present invention may be formed by a wide variety of processes. For example, the carrier layers may be formed by spunbonding processes, bonded-carded web forming processes or meltblowing processes.

In some embodiments both the meltblown and the carrier layers may be formed from a thermoplastic material selected from the group of materials including one or more polyolefins, polyesters, polyethers, polyvinyl chlorides and poiyamides. Copolymers or mixtures of one or more of these materials may also be desirable. For example, the meltblown and carrier layers may be formed from polyethylene, polypropylene, polybutylene or ethylene vinyl acetate. More particularly, the meltblown and carrier layers may be formed from a thermoplastic polypropylene material. In some embodiments, the meltblown and carrier layers may be formed from a thermoplastic polypropylene material.

Typically, the basis weight of the coarse, meltblown surface layer ranges from about 40 to about 100 grams per square meter. For example, the basis weight of the coarse, meltblown surface layer may range from about 60 to about 80 grams per square meter. More particularly, the basis weight of the coarse, meltblown surface layer may range from about 60 to about 70 grams per square meter.

Typically, the basis weight of the fine, absorbent, meltblown layer ranges from about 150 to about 200 grams per square meter. For example, the basis weight of the fine, absorbent, meltblown layer may range from about 160 to about 190 grams per square meter. More particularly, the basis weight of the fine, absorbent, meltblown surface layer may range from about 170 to about 180 grams per square meter.

Typically, the basis weight of the carrier layer adjacent the coarse, meltblown surface layer ranges from about 40 to about 90 grams per square meter. For example, the basis weight of the carrier layer adjacent the coarse, meltblown surface layer may range from about 45 to about 70 grams per square meter. More particularly, the basis weight of the carrier layer adjacent the coarse, meltblown surface layer may range from about 50 to about 55 grams per square meter.

Typically, the basis weight of the carrier layer adjacent the fine, absorbent, meltblown layer ranges from about 10 to about 30 grams per square meter. For example, the basis weight of the carrier layer adjacent the fine, absorbent, meltblown layer may range from about 10 to about 20 grams per square meter. More particularly, the basis weight of the carrier layer adjacent the fine, absorbent, meltblown surface layer may range from about 12 to about 18 grams per square meter.

Typically, the average fiber diameter of the coarse, meltblown surface layer ranges from about 10 to about 80 microns. For example, the average fiber diameter of the coarse, meltblown surface layer may range from about 20 to about 60 microns. More particularly, the average fiber diameter of the coarse, meltblown surface layer may range from about 30 to about 50 microns.

Average fiber diameter is determined optically and is determined by taking and averaging at least thirty (30) random fiber diameter measurements.

Typically, the average fiber diameter of the fine, absorbent, meltblown layer ranges from about 1 to 10 microns. For example, the average fiber diameter of the fine, absorbent, meltblown layer may range from about 2 to about 5 microns. More particularly, the average fiber diameter of the fine, absorbent, meltblown surface layer may range from about 3 to about 5 microns.

Typically, the average fiber diameter of the carrier layer adjacent the coarse, meltblown surface layer ranges from about 10 to about 30 microns. For example, the average fiber diameter of the carrier layer adjacent the coarse, meltblown surface layer may range from about 15 to about 25 microns. More particularly, the average fiber diameter of the carrier layer adjacent the coarse, meltblown surface layer may range from about 20 to about 25 microns.

Typically, the average fiber diameter of the carrier layer adjacent the fine, absorbent, meltblown layer ranges from about 10 to about 30 microns. For example, the average fiber diameter of the carrier layer adjacent the fine, absorbent, meltblown layer may range from about 15 to about 25 microns. More particularly, the average fiber diameter of the carrier layer adjacent the fine, absorbent, meltblown surface layer may range from about 20 to about 25 microns.

In some embodiments the web may be provided with a mottled surface appearance. The mottled surface effect may be created by the randomized distribution of the coarse shotty meltblown fibers as they are formed into a meltblown web. This effect is further enhanced by the addition of pigments into the polymer feed system.

In some embodiments, one or more of the layers may be treated with a surfactant to enhance moisture transfer through and into the respective layer.

In some embodiments, additional layers may be positioned between the meltblown absorbent layer and the carrier layer adjacent the coarse, shot-laden meltblown surface layer.

The composite nonwoven web may be used as a floor mat or as a wide.

OBJECTS OF THE INVENTION

It is one object of the present invention to provide a wide having satisfactory abrasive and absorbency characteristics.

It is another object of the present invention to provide a floor mat having satisfactory abrasive and absorbency characteristics.

Still further objects and the broad scope of applicability of the present invention will become apparent to those of skill in the art from the details given hereinafter. However, it should be understood that the detailed description of the preferred embodiment of the present invention is given only by way of illustration because various changes and modifications well within the spirit and scope of the invention should become apparent to those of skill in the art in view of the following detailed description.

DETAILED DESCRIPTION OF THE PREFERRED EMBODIMENT

Generally, it can be stated that the absorbent, abrasive composite nonwoven web of the present invention is prepared by first forming an apertured precursor abrasive composite material including an abrasive layer joined to a supporting carrier layer. Secondly, a precursor absorbent composite material is formed with the precursor absorbent composite material including an absorbent layer joined to a supporting carrier layer. Lastly, the two precursor composite materials are joined together in such a manner that the abrasive layer of the abrasive precursor composite forms an outer surface layer of the absorbent, abrasive composite nonwoven web material and the absorbent layer of the absorbent precursor composite forms an interior layer of the absorbent, abrasive composite nonwoven web material.

Figure 1:
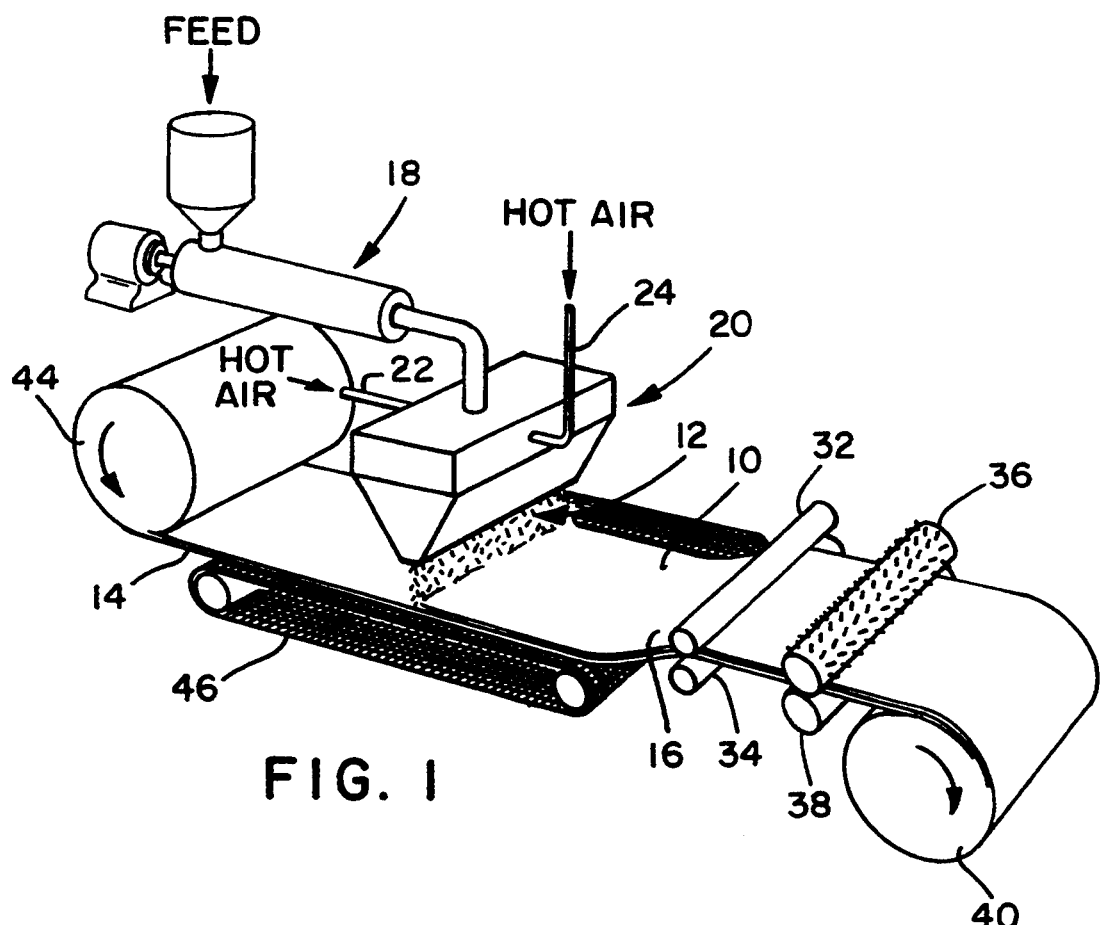
FIG. 1 is a schematic illustrating a method of forming an apertured precursor abrasive composite material.

Referring now to the Figures where like reference numerals refer to like structure or a like process step, attention is drawn to FIG. 1 where the process for forming an apertured precursor abrasive composite material is depicted. FIG. 1 reveals that a layer 10 of coarse, shot-laden meltblown fibers 12 is deposited upon a supporting carrier layer 14 to form the precursor abrasive composite material 16.

As used herein, the term "shot" refers to a mass of nonfibrous polymer (solid polymer globules) having a diameter of greater than 0.3 micrometers. A "shot-laden" web or layer is a web or layer which contains shot.

More specifically, polymer feed pellets (not shown) are introduced into an extruder 18 in which the polymer is melted and conveyed to a meltblowing diehead 20. The meltblowing diehead 20 is provided with (1) two forced hot air inlets 22 and 24, a multiplicity of extrusion orifices 26 through which the polymer melt is extruded as a stream of meltblown fibers 12 and (2) converging air slots 28 and 30. Typical meltblowing dieheads 20 may contain from about 10 to about 15 orifices 26 per linear centimeter (about 40 per linear inch) of diehead 20. For example, the meltblowing diehead 20 may contain from about 10 to about 20 orifices 26 per linear centimeter (about 25 to 50 orifices per linear inch) of diehead 20. The orifices 26 typically may range in diameter from about 0.0040 to about 0.0070 centimeters. For example, the orifices 26 may have a diameter of about 0.0057 centimeters.

As the polymer melt exits the meltblowing diehead 20, the interaction of the extrudate with hot air from the air slots 28 and 30 disrupts the extrudate to form generally discontinuous, semi-molten meltblown fibers 12 which immediately begin to solidify. However, in the present invention, prior to solidification of the fibers 12, while they are still at an elevated temperature and in a bondable condition, the fibers 12 are deposited onto the supporting carrier layer 14 at which time they intimately thermally bond thereto as the process of their solidification is completed. The resulting two layered precursor abrasive composite material 16 includes (1) a coarse, shot-laden abrasive meltblown layer 10 having an average fiber diameter of from about 10 to about 80 microns and a basis weight of from about 40 to about 100 grams per square meter, and (2) a supporting carrier layer 14 having an average fiber diameter of from about 10 to 30 microns and a basis weight of from about 40 to about 90 grams per square meter.

For example, the coarse, shot-laden meltblown layer 10 may have an average fiber diameter of from about 20 to about 60 microns. More particularly, the coarse, shot-laden meltblown layer 10 may have an average fiber diameter of from about 30 to about 50 microns.

For example, the coarse, shot-laden meltblown layer 10 may have a basis weight of from about 60 to about 80 grams per square meter. More particularly, the coarse, shot-laden meltblown layer 10 may have a basis weight of from about 60 to about 70 grams per square meter.

For example, the support or carrier layer 14 upon which the coarse, shot-laden meltblown layer 10 is deposited may have an average fiber diameter of from about 15 to about 25 microns. More particularly, the support or carrier layer 14 upon which the coarse, shot-laden meltblown layer 10 is deposited may have an average fiber diameter of from about 20 to about 25 microns.

For example, the support or carrier layer 14 upon which the coarse, shot-laden meltblown layer 10 is deposited may have a basis weight of from about 45 to about 70 grams per square meter. More particularly, the supporting carrier layer 14 may have a basis weight of from about 50 to about 55 grams per square meter.

If desired, the precursor abrasive composite material 16 may, then be calendared by a pair of nip rollers 32 and 34.

Thereafter, the precursor abrasive composite material 16 is hot pin apertured by passing the precursor abrasive composite material 16 through the nip formed by a heated pin roller 36 and a corresponding heated apertured roller 38 where the apertures of the apertured roller 38 correspond with the heated pins of the hot pin roller 36. The hot pin aperturing of these two layers provides a three-dimensional effect which improves the abrasiveness of the coarse, shot-laden meltblown layer.

Desirably, the hot pin aperturing is carried out at an elevated temperature of from about 100 degrees F. (38 degrees Centigrade) to about 150 degrees F. (66 degrees Centigrade). For example, the hot pin aperturing may be carried out at an elevated temperature of from about 115 degrees F. (46 degrees Centigrade) to about 125 degrees F. (52 degrees Centigrade).

The coarse, shot-laden meltblown layer 10 is typically oriented to be adjacent the hot apertured roller 38. However, the coarse, shot laden meltblown layer 10 may, in some embodiments, be oriented to be adjacent the hot pin roller 36 during the aperturing step.

Typically, the depth of penetration of the pins of the pin roller 36 should be at least about 0.061 inches (0.155 centimeters). For example, the depth of penetration of the pins of the pin roller 36 may range from about 0.061 inches (0.155 centimeters) to about 0.100 inches (0.254 centimeters). More particularly, the depth of penetration of the pins of the pin roller 36 may range from about 0.071 inches (0.180 centimeters) to about 0.095 inches (0.241 centimeters). Even more particularly, the depth of penetration of the pins of the pin roller 36 may range from about 0.081 inches (0.206 centimeters) to about 0.091 inches (0.231 centimeters).

The pressure in the nip created by the pin roller 36 and the apertured roller 38 may vary from about 60 to about 110 pounds per square inch, gauge (psig). For example, the pressure in the nip created by the pin roller 36 and the apertured roller 38 may vary from about 70 to about 110 pounds per square inch, gauge (psig). More particularly, the pressure in the nip created by the pin roller 36 and the apertured roller 38 may vary from about 90 pounds per square inch, gauge (psig) to about 110 pounds per square inch, gauge (psig). For example, the pressure in the nip created by the pin roller 36 and the apertured roller 38 may be about 100 pounds per square inch, gauge (psig).

The pin 36 and apertured 38 rollers serve to mold the fibers of the coarse, shot-laden meltblown layer 10 and the fibers of the supporting carrier layer 14 into a three-dimensional generally conical shape in the area of each aperture. Elevation of the temperature of the pin aperturing apparatus serves to lock the apertured surface, into the three-dimensional shape formed then the heated pins penetrate through both the coarse, shot-laden layer 10 and its supporting carrier layer 14 into the apertured roller. Accordingly, the surface area of the apertured layers is increased. Additionally, the three-dimensionally stabilized structure presents a much more aggressive abrasive medium for the removal of coarse dry dirt when the material is utilized as part of a wiper. Moreover, the three dimensional structure provides macropits and macro-troughs which act to entrap dirt in addition to the dirt trapping ability of the voids of the coarse, shot-laden meltblown layer 10. Lastly, it can also be stated that the apertures facilitate the transfer of liquid through the final product when it is being utilized to wipe up liquids.

The running speed of the precursor abrasive material 16 while hot pin aperturing is taking place should be limited to no more than about 50 feet per minute (about 15 meters per minute). At greater speeds detachment of the two layers occurs suggesting that the pins are having a "plucking" effect upon the precursor abrasive composite 16. In particular, the running speed of the precursor abrasive composite 16 during hot pin aperturing may range from about 10 to about 50 feet per minute (3 to about 15 meters per minute). More particularly, the running speed of the precursor abrasive composite 16 during hot pin aperturing may range from about 15 to about 30 feet per minute (4.5 to about 9 meters per minute). Even more particularly, the running speed of the precursor abrasive composite 16 during hot pin aperturing may range from about 15 to about 20 feet per minute (4.5 to about 6 meters per minute). After hot pin aperturing has occurred, the apertured precursor abrasive composite 16 is wound onto a storage roll 40 for subsequent utilization in forming the absorbent, abrasive composite nonwoven web 42 of the present invention.

As shown in FIG. 1, the supporting carrier layer 14 may be provided from a supply roll 44 and is simply unwound at the desired rate, or it can also be provided by forming it in-line on the forming wire 46 prior to deposition of the meltblown fibers 12 which will form the meltblown layer 10 on it.

Suitable polymer feed materials for producing the coarse, shot-laden meltblown layer 10 of the precursor abrasive composite layer 16 include, without limitation, thermoplastic materials selected from the group of materials including one or more polyolefins, polyesters, polyethers, polyvinyl chlorides and polyamides. Copolymers or mixtures of one or more of these materials may also be desirable. For example, the coarse, shot-laden meltblown layer 10 may be formed from polyethylene, polypropylene, polybutylene or ethylene vinyl acetate. More particularly, the coarse, shot-laden meltblown layer 10 may be formed from a thermoplastic polypropylene material. Suitable commercially available materials include Exxon 3045 and Hercules PRO-FAX polypropylene pellets.

Suitable types of processes which can be utilized to form the supporting layer 14 of the composite precursor abrasive web 16 of the present invention include spinbonding processes, bonded-carded processes, and meltblowing processes. Any of these processes may be utilized to form the support layer 14 and a wide variety of polymers or mixtures or blends of polymers may be used to form the support layer 14. Suitable polymeric materials from which the supporting carrier layer 14 may be produced include, without limitation, thermoplastic materials selected from the group of materials including one or more polyolefins, polyesters, polyethers, polyvinyl chlorides and polyamides. Copolymers or mixtures of one or more of these materials may also be desirable. For example, the supporting carrier layer 14 may be formed from polyethylene, such as linear low density polyethylene, polypropylene, polybutylene or ethylene vinyl acetate. More particularly, the supporting carrier layer 14 may be formed from a thermoplastic polypropylene material. One desirable material is a thermoplastic polypropylene material having a weight average molecular weight greater than about 200,000. This thermoplastic material is desired because of its availability, ease of spinning, and abrasive properties. Suitable commercially available materials include Exxon 3045 and Hercules PRO-FAX polypropylene pellets.

Of course, other fibers and/or particulates such as, for example, cellulosic fibers, wood pulp fibers, activated charcoal and hydrogel materials such as superabsorbent hydrogel materials may, if desired, be included within either of the layers 10 or 14 for a variety of differing reasons. For example, activated charcoal may be incorporated into the support layer as an aid in removing odors which might arise during use of the present invention.

It is desired that the supporting carrier layer 14 have a softening point which is sufficiently lower than the temperature of formation of the meltblown fibers 12 and that the meltblown fibers 12 be formed from a material which is miscible with material from which the supporting carrier material 14 is formed. This relationship assures that thermal bonding occurs between the fibers of the two layers when the fibers 12 of the meltblown layer 10 are deposited upon the supporting carrier layer 14.

Figure 2:
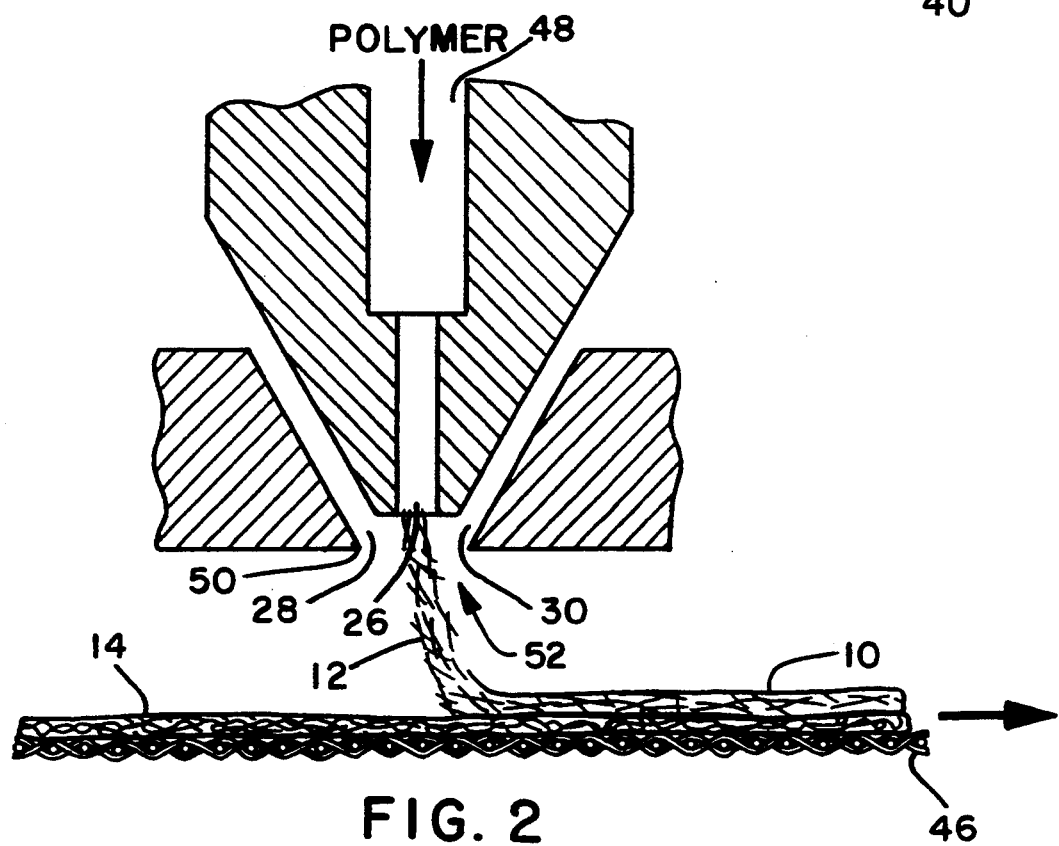
FIG. 2 is a cross-sectional view of a meltblowing die which may be used in the process schematically presented in FIG. 1.

FIG. 2 illustrates, in schematic cross-section, the configuration of the meltblowing diehead 20 illustrated in FIG. 1. The meltblowing diehead 20 includes a polymer melt supply passageway 48 which is stepped down in size to about 0.0057 centimeters at the orifice 26. Depending upon processing conditions, the orifices 26 may have a recessed, stuckout or tangential configuration with respect to the dietip 50 of the diehead 20. While the recessed configuration is illustrated in FIG. 2, under some processing conditions a "stuck-out" configuration may be more desirable. The extrusion temperature of the polymeric material which will form the coarse, shot-laden meltblown layer 10 will vary somewhat with the thermoplastic polymeric material used. If thermoplastic polypropylene is utilized, the temperature of extrusion may vary from about 228 degrees centigrade (443 degrees F.) to about 315 degrees centigrade (600 degrees F.). The meltblowing diehead 20 is also provided with hot air slots 28 and 30 which converge to form a slot opening 52 and extend the width of the meltblowing diehead 20. In operation, hot air is supplied to the hot air inlets 22 and 24 which communicate with the hot air slots 28 and 30. When the hot air exits the slot opening 52, a downward hot air flow is formed which disrupts the polymer extrudate as it leaves the orifices 26 of the meltblowing diehead 20. The hot air flow serves to draw out and attenuate the extruded fibers 12 and the flow rate can be used to control the resulting fiber diameter and, to a certain degree, the abrasiveness of the resulting meltblown layer 10. This statement may be arrived at from the fact that, if all else is generally the same, the greater the fiber diameter of the meltblown fibers 12, the greater will be the abrasion resistance of the meltblown layer 10. In this regard, it is known that, generally speaking, lower hot air flow rates provide thicker more abrasive resistant fibers and higher flow rates create thinner less-abrasive resistant fibers.

The resulting meltblown fibers 12 are blown downwardly onto the supporting carrier layer 14 which is juxtaposed upon the forming wire 46. As has been previously stated, it is important that the meltblown fibers 12 are deposited upon the supporting carrier layer 14 before the fibers 12 have sufficient time to solidify. Hence, the meltblown fibers 12 are deposited upon the supporting carrier layer 14 while they are in a semi-molten state. This action not only fosters the formation of shot but also permits the meltblown fibers 12 to intimately thermally bond to the supporting carrier layer 14. To achieve adequate shot formation and satisfactory deposition of the meltblown fibers 12 while they are still in a semi-molten state, a number of parameters should be properly balanced. For example, the polymer flow rate and the not air flow rate should be properly adjusted. Likewise, the diameter of the slot opening 52, and the distance between the die tip 50 and the supporting carrier layer 14 should be adjusted. These adjustments are known to those of skill in the art. In the past, these conditions have occasionally inadvertently occurred during commercial meltblown fiber operations which were manufacturing fine denier meltblown webs. The resulting material has been referred to by those in the art as "shorty" or "shot-laden" material and was typically rejected as unsatisfactory waste material. However, consistent formation of a semi-molten shot-laden meltblown layer 10 onto the carrier layer 14 greatly improves the abrasive characteristics of the meltblown layer 10 of the present invention and, therefore, such process conditions are desirable for purposes of forming the abrasive meltblown layer 10 of the precursor abrasive composite nonwoven web 42 of the present invention.

It has been found that the abrasive meltblown layer 10 of the present invention can be formed directly upon the supporting carrier layer 14 by the above said apparatus and process using a polypropylene polymer having a melt flow rate when measured in accordance with ASTM D 1238 condition L (230 degrees C.) of from about 25 to 1,000 decigrams per minute. These materials are extruded through the orifices 26 of the die tip 50 at a temperature of from about 225 degrees Centigrade (403 degrees F.) to about 280 degrees Centigrade (536 degrees F.) and at a rate of from about 0.25 to about 0.71 kilograms per linear centimeter of die tip 50 width per hour. Additionally, hot air having a temperature of from about 200 to 300 degrees Centigrade (392 to about 572 degrees F.) is passed though the meltblowing diehead 20 at a pressure of from about 0.25 to about 1 pounds per square inch and at a flow rate of from about 50 to about 125 standard cubic feet per minute. Further, the tip 50 of the meltblowing diehead 20 is maintained at a distance of from about 25 to about 35 centimeters (10 to about 14 inches) from the supporting carrier layer 14. These conditions result in the deposition of semi-molten polypropylene fibers 12 having an average fiber diameter of from about 40 to about 70 micrometers (microns). This average fiber diameter is substantially greater than conventional non-elastic meltblown fibers, which typically have fiber diameters of less than about 10 micrometers.

Experimentation has demonstrated that polypropylene material with a melt flow rate of about 35 decigrams per minute when measured in accordance ASTM D 1238, condition L (230 degrees C.), provides highly desirable results when extruded at a temperature of about 279 degrees Centigrade (535 degrees F.) and subjected to primary air heated to a temperature of about 290 degrees Centigrade (554 degrees F.) and applied at a pressure of about 0.6 pounds per square inch and at a rate of about 95 standard cubic feet per minute. The resulting fibers have an average (average is of 30 measurements) fiber diameter of about 46 microns with a standard deviation of about 23 microns. The range of fiber diameters observed was from about 15 microns to about 100 microns. The forming distance between the dietip and the forming wire 46 was about 31 centimeters (about 12 inches).

Other polypropylene materials have been tested. For example, polypropylene material with a melt flow rate of about 90 decigrams per minute when measured in accordance ASTM D 1238, condition L (230 degrees C.), when extruded at a temperature of about 248 degrees Centigrade (478 degrees F.) and subjected to primary air heated to a temperature of about 280 degrees Centigrade (535 degrees F.) and applied at a pressure of about 1.0 pounds per square inch and at a rate of about 100 standard cubic feet per minute provides fibers have an average (average is of 30 measurements) fiber diameter of about 68 microns with a standard deviation of about 39 microns. The range of fiber diameters observed was from about 10 microns to about 150 microns. The forming distance between the dietip and the forming wire 46 was about 31 centimeters (about 12 inches).

Additionally, polypropylene material with a melt flow rate of about 800 decigrams per minute when measured in accordance ASTM D 1238, condition L (230 degrees C.), when extruded at a temperature of about 228 degrees Centigrade (443 degrees F.) and subjected to primary air heated to a temperature of about 195 degrees Centigrade (385 degrees F.) and applied at a pressure of about 0.3 pounds per square inch and at a rate of about 75 standard cubic feet per minute provides fibers have an average (average is of 33 measurements) fiber diameter of about 62 microns with a standard deviation of about 37 microns. The range of fiber diameters observed was from about 25 microns to about 200 microns. The forming distance between the dietip and the forming wire 46 was about 31 centimeters (about 12 inches).

In some embodiments, it may be desirable to treat the precursor abrasive composite 16 with wetting agents such as, for example, surfactants. Exemplary materials of this type may be obtained under the trade designations Gemrex Sm-33 (a nonionic surfactant), Triton X-102 (a nonionic surfactant) and Aerosol OT (an anionic surfactant).

Figure 3:
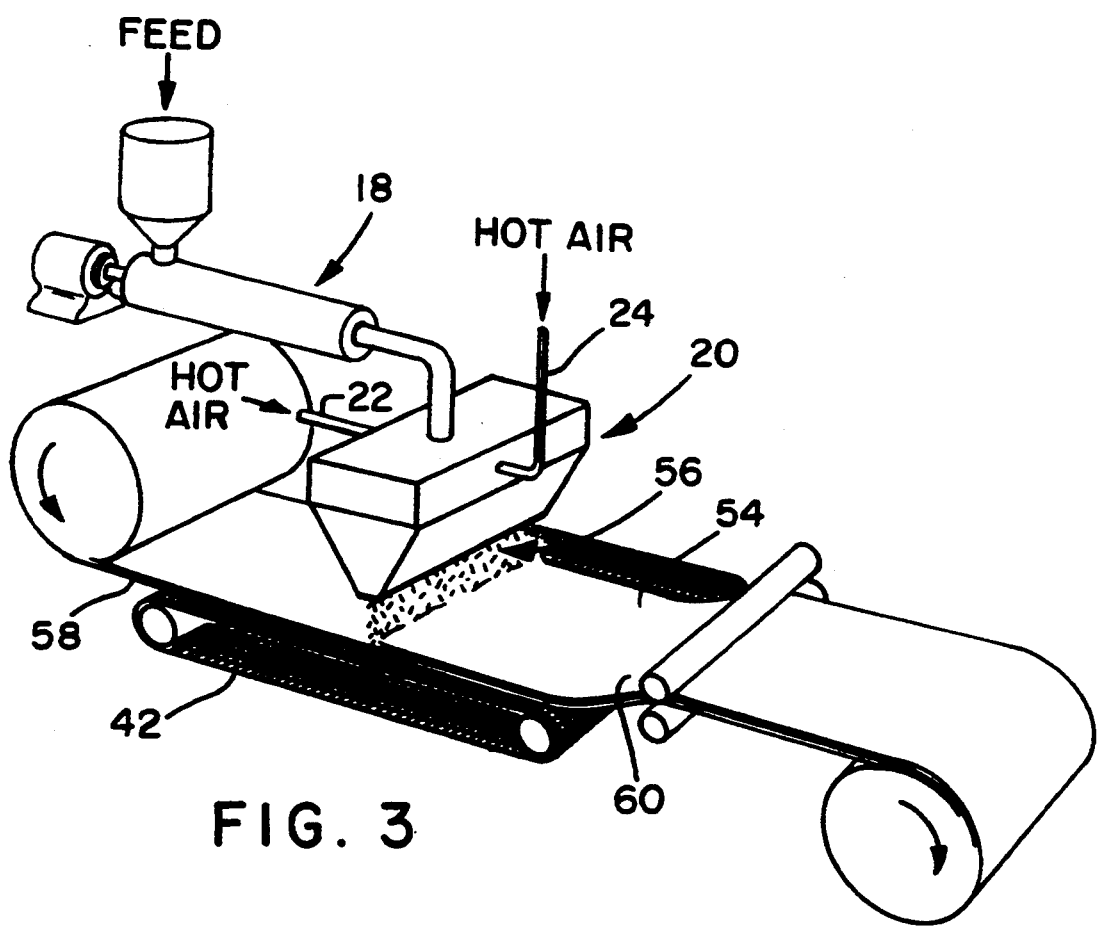
FIG. 3 is a schematic illustrating a method of forming a precursor absorbent composite material.

Reference is now directed to FIG. 3 where the process for forming the precursor absorbent composite material is depicted. FIG. 3 reveals that a layer 54 of conventional fine denier meltblown fibers 56 is deposited upon a supporting carrier layer 58 to form the precursor absorbent composite material 60. The resulting two layered precursor absorbent composite material 60 includes (1) an absorbent meltblown layer 54 of fine denier meltblown fibers 56 having a basis weight of from about 150 to about 200 grams per square meter, and (2) a supporting carrier layer 58 having a basis weight of from about 10 to about 30 grams per square meter.

For example, the absorbent meltblown layer 54 may have a basis weight of from about 160 to about 190 grams per square meter. More particularly, the absorbent meltblown layer 54 may have a basis weight of from about 170 to about 180 grams per square meter.

For example, the supporting carrier layer 58 upon which the absorbent meltblown layer 54 is deposited may have a basis weight of from about 10 to about 20 grams per square meter. For example, the supporting carrier layer 58 may have a basis weight of from about 12 to about 18 grams per square meter.

Typically, the average fiber diameter of the fine, absorbent, meltblown layer 54 ranges from about 1 to 10 microns. For example, the average fiber diameter of the fine, absorbent, meltblown layer 54 may range from about 2 to about 5 microns. More particularly, the average fiber diameter of the fine, absorbent, meltblown surface layer 54 may range from about 3 to about 5 microns.

Typically, the average fiber diameter of the spunbonded layer 58 adjacent the fine, absorbent, meltblown layer ranges from about 10 to about 30 microns. For example, the average fiber diameter of the spunbonded layer 58 adjacent the fine, absorbent, meltblown layer may range from about 15 to about 25 microns. More particularly, the average fiber diameter of the spunbonded layer 58 adjacent the fine, absorbent, meltblown surface layer may range from about 20 to about 25 microns.

The materials which are stated above as being satisfactory to form the abrasion meltblown layer 10 and the supporting carrier layer 14 are, likewise, generally satisfactory for use in the formation of the absorbent meltblown layer 54 and the supporting carrier layer 58.

As was the case with the supporting carrier layer 14, the supporting carrier layer 60 may be formed through the utilization of a wide variety of processes. For example, the supporting carrier layer 58 may be formed by spunbonding processes, bonded-carded web processes and meltblowing processes.

In some embodiments, it may be desirable to treat the absorbent meltblown layer 54 with conventional materials which enhance its ability to absorb liquids. The materials may enhance the layer's absorbing ability by either increasing the amount of liquid the layer 54 can absorb or by increasing the rate of absorption of liquids by the layer 54. Exemplary materials of this type include, without limitation, Gemrex Sm-33 (a nonionic surfactant), Triton X-102 (a nonionic surfactant) and Aerosol OT (an anionic surfactant).

Figure 4:
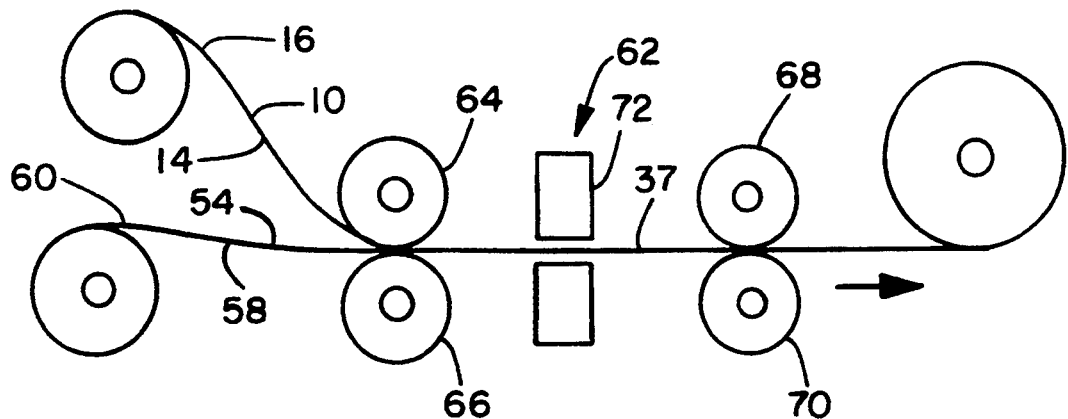
FIG. 4 is a schematic illustrating a method for joining the abrasive precursor to the absorbent precursor.

FIG. 4 is a schematic representation of the process by which the two precursor materials 16 and 60 are joined to form the absorbent, abrasive composite nonwoven web 42 of the present invention. FIG. 4 illustrates that the two precursor webs 16 and 60 are unwound and superposed in overlying juxtaposed configuration in such a manner that the coarse, shot-laden meltblown layer 10 of the abrasive precursor web 16 forms an outer surface with the fine denier, absorbent meltblown layer 54 of the absorbent precursor web 60 being placed next to the supporting carrier layer 14 of the coarse, shot-laden abrasive meltblown layer 10 of the abrasive precursor web 16.

Once the two precursor webs 16 and 60 have been so positioned, they are passed through a station 62 where they are joined together in a conventional manner. The station 62 generally includes two pairs of nip rolls 64/66 and 69/70 which serve to maintain the alignment of the precursor materials 16 and 60 and a joining arrangement 72. A variety of different methods for joining the two precursor webs 16 and 60 together may be utilized. For example, the two precursor webs 16 and 60 may be joined together by adhesive application or thermal bonding. One desirable method for joining the two precursor webs 16 and 60 together is ultrasonic bonding. Ultrasonic bonding may be accomplished through the use of a Calemard ultrasonic bonder. In this machine the bonding working width is about 1.6 meters. The working width is covered by seven ultrasonic sealing devices (type HS 20 1200 W) with a titanium booster and a nine inch coated titanium horn. The frequency of vibration is about 20 kilohertz and the bonding heads can be raised and lowered independently and collectively. Operation speeds may be in the range of from about 5 to in excess of 20 meters per minute.

In some embodiments, it may be desirable to insert an apply a wide variety of materials between the precursor materials 16 and 60 prior to their being joined together at the station 62. Thus, the present invention contemplates embodiments which include more than four layers described in detail in this application.

Figure 5:
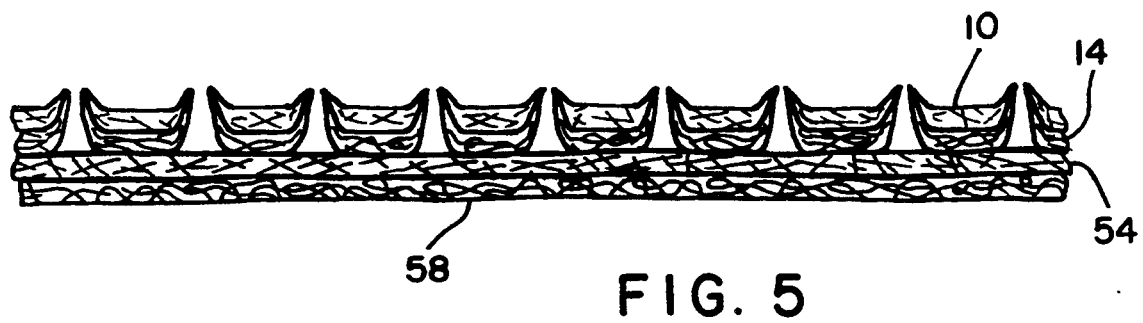
FIG. 5 is a cross-sectional view of a four-layered embodiment of the present invention.

FIG. 5 is a cross-sectional schematic view of a four-layer embodiment of the present invention which has been discussed with respect to FIGS. 1-4.

Those of skill in the art will readily recognize that a wide variety of variations of the embodiment discussed above may be made. For example, additional layers performing other functions may be interposed between the two precursor layers and all of the layers may be joined together at the joining station 62. Additionally, other layers may be juxtaposed adjacent the supporting carrier layer 58 of the fine denier absorbent meltblown layer 54 of the absorbent precursor 60. Such layers may even take the form of, for example, a film layer which prevents a user's hand from becoming wet when the final product is to be used as a wipe.

In some further embodiments it may be desirable to despense With the supporting carrier layer 58 of the fine denier absorbent meltblown layer 54 altogether. In such a situation the fine denier absorbent meltblown layer 54 can, if such is desired, be formed directly on the surface of the supporting carrier layer 14 for the abrasive meltblown layer 10. Such an arrangement would result in a three layer embodiment.

In all of the product forms of this invention, it may be advantageous to impregnate various layers with various additives, such as detergents, surfactants, cleaners, bleaches, perfumes, disinfectants, germicides, virucides and absorbent particles such as, for example, wood pulp fibers and/or hydrogel particles commonly referred to as superabsorbent particulates.

The material of the present invention may be utilized in a wide variety of environments. Typically, the wipe or mat will be utilized for a limited period of time, disposed of, and replaced with another wipe or mat.

What is claimed is:

1. A composite nonwoven web comprising a coarse, shot-laden meltblown layer formed from a thermoplastic material, the coarse, shot-laden meltblown layer being a surface layer of the composite nonwoven web; a first supporting carrier layer immediately adjacent the coarse, shot-laden meltblown layer, the supporting carrier layer being formed from a thermoplastic material; an absorbent meltblown layer formed from a thermoplastic material, the absorbent meltblown layer being an interior layer of the nonwoven web; and a second supporting carrier layer immediately adjacent the absorbent meltblown layer, the second supporting carrier layer being formed from a thermoplastic material; wherein the coarse, shot-laden meltblown surface layer and the first supporting carrier layer are formed into a three-dimensional matrix of generally conical protrusions which taper to an aperture extending through the two layers.

2. The composite nonwoven web of claim 1, wherein the supporting carrier layers are formed from one or more polyolefins, polyesters, polyethers, polyvinyl chlorides or polyamides.

3. The composite nonwoven web of claim 1 wherein at least one of the supporting carrier layers is formed from polyethylene, polypropylene, polybutylene or ethylene vinyl acetate.

4. The composite nonwoven web of claim 1 wherein at least one of the supporting carrier layers is a spunbonded layer, a bonded-carded layer or a meltblown layer.

5. The composite nonwoven web of claim 4 wherein at least one of the supporting carrier layers is formed from a spunbonded thermoplastic polypropylene material.

6. The composite nonwoven web of claim 1 wherein at least one of the meltblown layers is formed of one or more polyolefins, polyesters, polyethers, polyvinyl chlorides or polyamides.

7. The composite nonwoven web of claim 6 wherein at least one of the meltblown layers is formed of polyethylene, polypropylene, polybutylene or ethylene vinyl acetate.

8. The composite nonwoven web of claim 7 wherein at least one of the meltblown layers is formed from a thermoplastic polypropylene material.

9. The composite nonwoven web of claim 1 wherein the average fiber diameter of the coarse, shot-laden layer is from about 10 to about 80 microns.

10. The composite nonwoven web of claim 9 wherein the average fiber diameter of the coarse, shot-laden layer is from about 20 to about 60 microns.

11. The composite nonwoven web of claim 10 wherein the average fiber diameter of the coarse, shot-laden layer is from about 30 to about 50 microns.

12. The composite nonwoven web of claim 1 wherein the basis weight of the coarse, shot-laden meltblown layer is from about 40 to about 100 grams per square meter.

13. The composite nonwoven web of claim 12 wherein the basis weight of the coarse, shot-laden meltblown layer is from about 60 to about 80 grams per square meter.

14. The composite nonwoven web of claim 13 wherein the basis weight of the coarse, shot-laden meltblown layer is from about 60 to about 70 grams per square meter.

15. The composite nonwoven web of claim 1 wherein the basis weight of the first supporting carrier layer is from about 40 to about 90 grams per square meter.

16. The composite nonwoven web of claim 15 wherein the basis weight of the first supporting carrier layer is from about 45 to about 70 grams per square meter.

17. The composite nonwoven web of claim 16 wherein the basis weight of the first supporting carrier layer is from about 50 to about 55 grams per square meter.

18. The composite nonwoven web of claim 1 wherein the basis weight of the interior absorbent layer is from about 150 to about 200 grams per square meter.

19. The composite nonwoven web of claim 18 wherein the basis weight of the interior absorbent layer is from about 160 to about 190 grams per square meter.

20. The composite nonwoven web of claim 19 wherein the basis weight of the interior absorbent layer is from about 170 to about 180 grams per square meter.

21. The composite nonwoven web of claim 1 wherein the basis weight of the second supporting carrier layer is from about 10 to about 30 grams per square meter.

22. The composite nonwoven web of claim 21 wherein the basis weight of the second supporting carrier layer is from about 10 to about 20 grams per square meter.

23. The composite nonwoven web of claim 22 wherein the basis weight of the second supporting carrier layer is from about 12 to about 18 grams per square meter.

24. The composite nonwoven web of claim 1 wherein the web is pigmented to provide a mottled appearance.

25. A floor mat comprising the composite nonwoven web of claim 1.

26. A wipe comprising the composite nonwoven web of claim 1.

27. A composite nonwoven web adapted for use as a wipe, said web comprising:
a coarse, shot-laden meltblown layer formed from a thermoplastic material, the coarse, shot-laden meltblown layer being a surface layer of the composite nonwoven web;
a first supporting carrier layer immediately adjacent the coarse, shot-laden meltblown layer, the supporting carrier layer being formed from a thermoplastic material;
an absorbent meltblown layer form from a thermoplastic material, the absorbent meltblown layer being an interior layer of the nonwoven web;
a second supporting carrier layer immediately adjacent the absorbent meltblown layer, the second supporting carrier layer being formed from a thermoplastic material; and
a three-dimensional matrix of generally conical protrusions which taper to an aperture extending through two layers, the conical protrusions being composed of the coarse, shot-laden meltblown surface layer and the first supporting carrier layer.

* * * * *

UNITED STATES PATENT AND TRADEMARK OFFICE
CERTIFICATE OF CORRECTION

PATENT NO. : 5,429,854
DATED      : July 4, 1995
INVENTOR(S) : Kenneth J. G. Currie, Philip J. Mogel It is certified that error appears in the above-identified patent and that said Letters Patent is hereby corrected as shown below:

Column 5, line 45, "as a wide" should read --as a wipe--;

Column 5, line 49, "provide a wide" should read --provide a wipe--;

Column 10, line 52, "as 'shorty' or" should read --as "shotty" or--;

Column 13, line 40, "insert an apply" should read --insert or apply--;

Column 13, line 62, "despense With the" should read --despense with the--.

Signed and Sealed this

Fifth Day of December, 1995

Attest:

Attesting Officer

BRUCE LEHMAN
Commissioner of Patents and Trademarks